(12) United States Patent
Ahmad (10) Patent No.: US 9,141,539 B2
(45) Date of Patent: Sep. 22, 2015

(54) SYSTEM AND METHOD FOR OBJECT DELETION IN PERSISTENT MEMORY USING BITMAP WINDOWS

(71) Applicant: Oracle International Corporation, Redwood Shores, CA (US)

(72) Inventor: Saqib Ahmad, San Jose, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 191 days.

(21) Appl. No.: 13/782,433

(22) Filed: Mar. 1, 2013

(65) Prior Publication Data
US 2014/0032841 A1    Jan. 30, 2014

Related U.S. Application Data (60) Provisional application No. 61/677,390, filed on Jul. 30, 2012.

(51) Int. Cl.
| | | |
|---|---|---|
| G06F 12/02 | (2006.01) | |
| G06F 3/06 | (2006.01) | |
| G07F 7/10 | (2006.01) | |

(52) U.S. Cl.
CPC ........ *G06F 12/0253* (2013.01); *G06F 12/0246* (2013.01); *G06F 3/0679* (2013.01); *G06F 12/0269* (2013.01); *G06F 2212/177* (2013.01); *G06F 2212/202* (2013.01); *G07F 7/1008* (2013.01)

(58) Field of Classification Search
CPC .............. G06F 12/0253; G06F 12/023; G06F 12/0246; G06F 12/0269; G06F 12/0276
USPC ................... 711/115, 103; 707/816
See application file for complete search history.

(56) References Cited

U.S. PATENT DOCUMENTS

| | | | | |
|---|---|---|---|---|
| 5,933,847 | A * | 8/1999 | Ogawa ......................... | 711/103 |
| 6,453,403 | B1 * | 9/2002 | Czajkowski ................. | 711/170 |
| 6,480,935 | B1 * | 11/2002 | Carper et al. ................ | 711/115 |
| 6,604,168 | B2 * | 8/2003 | Ogawa ......................... | 711/103 |
| 6,735,680 | B2 * | 5/2004 | Ahmad ......................... | 711/173 |
| 7,797,498 | B2 * | 9/2010 | Jung et al. .................... | 711/154 |

(Continued)

OTHER PUBLICATIONS

International Searching Authority, International Search Report and Written Opinion for PCT International Patent Application No. PCT/US2013/052780, Dec. 9, 2013, 11 pages.

(Continued)

*Primary Examiner* — Aimee Li
*Assistant Examiner* — Alex Olson
(74) *Attorney, Agent, or Firm* — Tucker Ellis LLP (57) ABSTRACT

A system and method for object deletion in persistent memory using bitmap windows representing memory chunks. In accordance with an embodiment, the system can generally be used with computing environments that use persistent memory, such as smart cards, Java Cards, and other resource-constrained environments. In accordance with an embodiment, the system comprises a processor or computational engine and a persistent memory for storage of software objects; and a data structure which can include one or more memory bitmap windows, each of which represents a chunk of addressable space in the persistent memory; wherein the system uses the one or more memory bitmap windows in deleting non-reachable objects from the persistent memory.

20 Claims, 7 Drawing Sheets

(56) References Cited

U.S. PATENT DOCUMENTS

| | | | |
|---|---|---|---|
| 2003/0221047 A1* | 11/2003 | Ahmed | 711/103 |
| 2007/0136401 A1* | 6/2007 | Jung et al. | 707/206 |
| 2007/0174369 A1* | 7/2007 | Detlefs | 707/206 |
| 2008/0162610 A1* | 7/2008 | Rossmann et al. | 707/206 |
| 2009/0248766 A1* | 10/2009 | Garthwaite et al. | 707/206 |
| 2009/0327372 A1* | 12/2009 | Ylonen | 707/206 |
| 2010/0223429 A1* | 9/2010 | Cher et al. | 711/122 |

OTHER PUBLICATIONS

Srisa-An, Active memory processor: a hardware garbage collector for real-time JAVA embedded devices, Apr. 1, 2003, pp. 89-101. Relevant sections: p. 89, right-hand column, line 20-p. 90, left-hand column, line 12; p. 91, left hand column, line 33; p. 91, left-hand column, line 33-p. 93, left-hand column; figures 1, 2, 3, 5.

* cited by examiner

SYSTEM AND METHOD FOR OBJECT DELETION IN PERSISTENT MEMORY USING BITMAP WINDOWS

CLAIM OF PRIORITY

This application claims the benefit of priority to U.S. Provisional Patent Application titled "SYSTEM AND METHOD FOR OBJECT DELETION IN PERSISTENT MEMORY USING BITMAP WINDOWS", application Ser. No. 61/677,390, filed Jul. 30, 2012; which application is herein incorporated by reference.

CROSS-REFERENCE TO RELATED PATENTS

This application is related to U.S. Pat. No. 6,735,680, titled "METHOD AND APPARATUS FOR DELETING OBJECTS FROM MEMORY WITHIN A SMART CARD", application Ser. No. 10/154,868, filed on May 24, 2002, and issued on May 11, 2004; which patent is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to persistent memory storage, and are particularly related to resource-constrained environments and other computing environments, and to systems and methods for deleting non-reachable objects from persistent memory, using bitmap windows representing memory chunks.

BACKGROUND

A typical resource-constrained environment, such as a smart card or similar execution environment or device, may have limited random access memory resources, and instead use persistent memory as a default location for creating and storing software objects.

Such environments have a need for reclaiming persistent memory which is in use by objects that have become garbage by virtue of being nonreachable from a defined set of roots. Garbage collection algorithms which may be useful in other environments, such as Java SE, often rely on techniques such as moving or marking the objects directly. However, these techniques are not as useful in a resource-constrained, smart card, or similar execution environment, since moving or marking objects in persistent memory is a time-consuming, and potentially damaging, operation given that only a limited number of data writes can be made to a persistent memory device before it wears out.

SUMMARY

Described herein is a system and method for object deletion in persistent memory using bitmap windows representing memory chunks. In accordance with an embodiment, the system can generally be used with computing environments that use persistent memory, such as smart cards, Java Cards, and other resource-constrained environments. In accordance with an embodiment, the system comprises a processor or computational engine and a persistent memory for storage of software objects; and a data structure which can include one or more memory bitmap windows, each of which represents a chunk of addressable space in the persistent memory; wherein the system uses the one or more memory bitmap windows in deleting non-reachable objects from the persistent memory.

DETAILED DESCRIPTION

As described above, a typical resource-constrained environment, such as a smart card or similar execution environment or device, may have limited random access memory resources, and instead use persistent memory as a default location for creating and storing software objects. Such environments have a need for reclaiming persistent memory which is in use by objects that have become garbage by virtue of being nonreachable from a defined set of roots. However, garbage collection algorithms which may be useful in other environments, but rely on techniques such as moving or marking the objects directly, are not as useful in a resource-constrained, smart card, or similar execution environment, since moving or marking objects in persistent memory is a time-consuming, and potentially damaging, operation given that only a limited number of data writes can be made to a persistent memory device before it wears out.

Some examples of the types of approach that can be used to address this include: use of a brute force algorithm to check each object to determine if it is referenced from any other object in the system; use of a reference counting algorithm which updates objects with a reference count such that a reference count of 0 indicates that the object is not referenced by another; or use of a RAM bitmap representing objects in memory.

A problem with the first two of these approaches is that they do not account for cyclical references for even simple cycles. The first approach is also time-consuming since in a worst-case scenario potentially every object in the system will have to be checked for every other object in the system, to determine references from one object to another. A problem with the third approach is that it relies on dereferencing objects, such that the system uses object references from an object table rather than actual address; however this slows the overall execution environment since many operations will require object addresses, and will have to go through the conversion process to get the address from a reference.

In accordance with an embodiment, described herein is a system and method for object deletion in persistent memory using bitmap windows representing memory chunks. In accordance with an embodiment, the system can generally be used with computing environments that use persistent memory, such as smart cards, Java Cards, and other resource-constrained environments. In accordance with an embodiment, the system comprises a processor or computational engine and a persistent memory for storage of software objects; and a data structure which can include one or more memory bitmap windows, each of which represents a chunk of addressable space in the persistent memory; wherein the system uses the one or more memory bitmap windows in deleting non-reachable objects from the persistent memory.

In accordance with various embodiments, some advantages of the systems and methods described herein include that it can provide a fast version of mark-sweep garbage collection technique which addresses the cyclical referencing problem; that there is no need for dereferencing objects; that there is also no need to write to persistent memory until actual reclamation of memory; and that the approach is scaleable such that an increase in the overall target memory area does not increase resource requirements.

Figure 1:
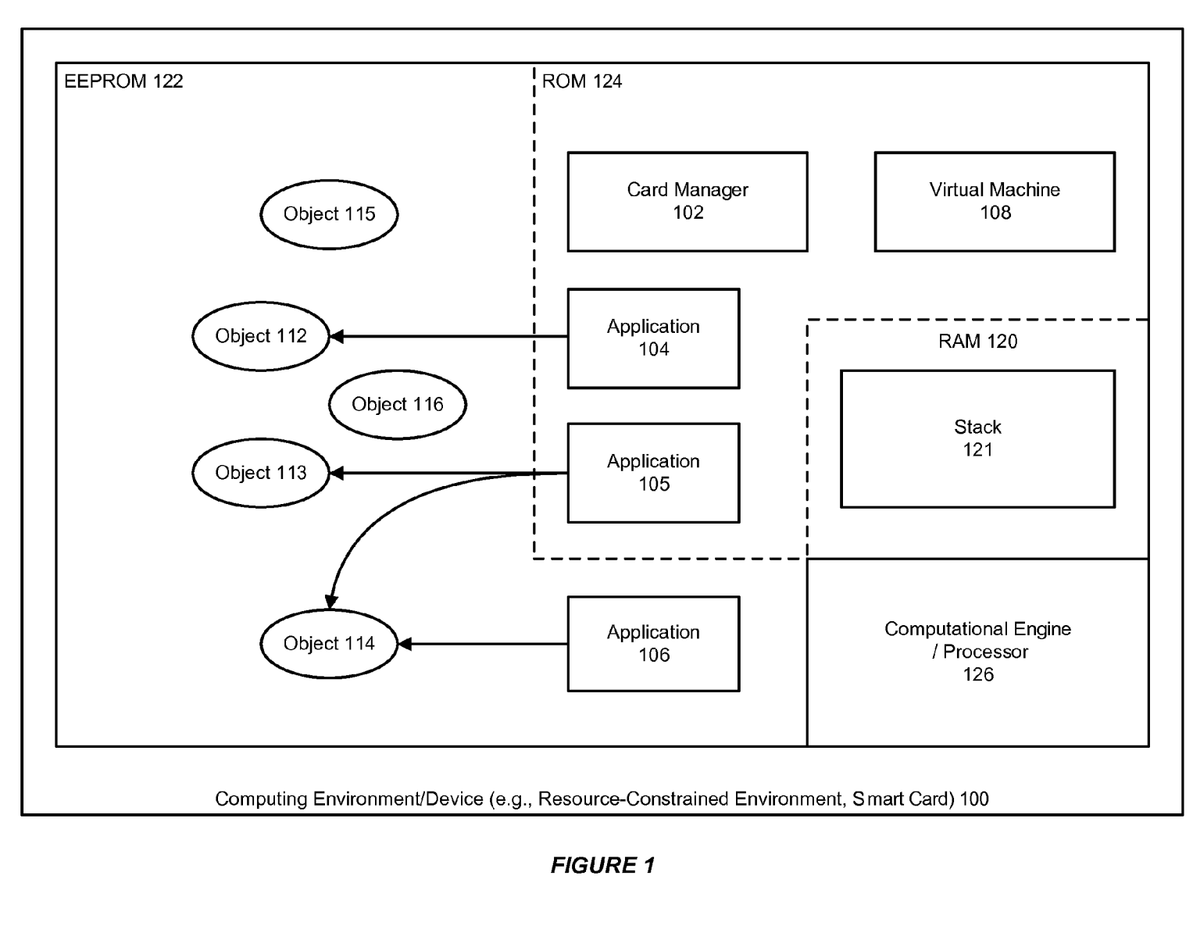
FIG. 1 illustrates an example of a computing environment that uses persistent memory, such as a resource-constrained environment or smart card, in accordance with an embodiment.

FIG. 1 illustrates an example of a computing environment that uses persistent memory, such as a resource-constrained environment or smart card, in accordance with an embodiment.

As shown in FIG. 1, in accordance with an embodiment, a computing environment or device 100, such as a resource-constrained environment, smart card, or other environment, can be considered a miniature computing device, comprising a processor or computational engine 126, which can include circuitry for performing computational operations; and one or more memory, such as a random access memory (RAM) 120, electrically erasable programmable read-only memory (EEPROM) 122, and/or read-only memory (ROM) 124.

In accordance with an embodiment, the RAM can include a volatile random access memory, the EEPROM can include a writeable non-volatile memory, and the ROM can include a read-only memory. The RAM can be used to store data items and data structures, such as a system stack 121. The ROM can include a virtual machine 108, such as a Java virtual machine, which allows applications written in a platform-independent programming language, such as Java, to be executed by the smart card; and can also contain one or more applications 104, 105, which provide services for clients accessing the smart card. In accordance with an embodiment, applications 106 can also be located in EEPROM, or in both ROM and/or EEPROM.

In accordance with an embodiment, the system can include a card manager 102, or a similar logic, which includes code for managing the execution of applications on the computing environment or device (including, for example, enabling communications between clients and applications); and deleting objects from memory. For example, as illustrated in FIG. 1, during operation of the device the EEPROM can contain a plurality of objects 112, 113, 114, which are accessed by applications 104, 105 (more specifically, application 104 accesses object 112, application 105 accesses objects 113 and 114, and application 106 accesses object 114); while other objects 115, 116, that have become unlinked, are no longer referenced by any application. It is generally desirable to delete these unreferenced objects to free up memory space.

The environment illustrated in FIG. 1 is provided by way of illustration of one type of environment that can utilize the systems and methods described herein. In accordance with various embodiments, the invention is not limited to resource-constrained environments or smart cards, or to the particular environment or configuration described above, and can generally be used with other types of computing environment, device, or system that can store object in a writeable persistent or non-volatile memory.

In accordance with an embodiment, a system and method is provided for use of bitmap windows which represent a chunk of memory. The technique uses an algorithm or method which can work with very limited resources, while mapping a large amount of addressable space. The technique is also scaleable such that, for increased persistent memory size, even if the overall RAM size remains relatively unchanged, the algorithm or method will still work. Additionally, the algorithm or method does not reduce overall system performance as might be the case with brute-force, reference counting, and dereferencing techniques.

Figure 2:
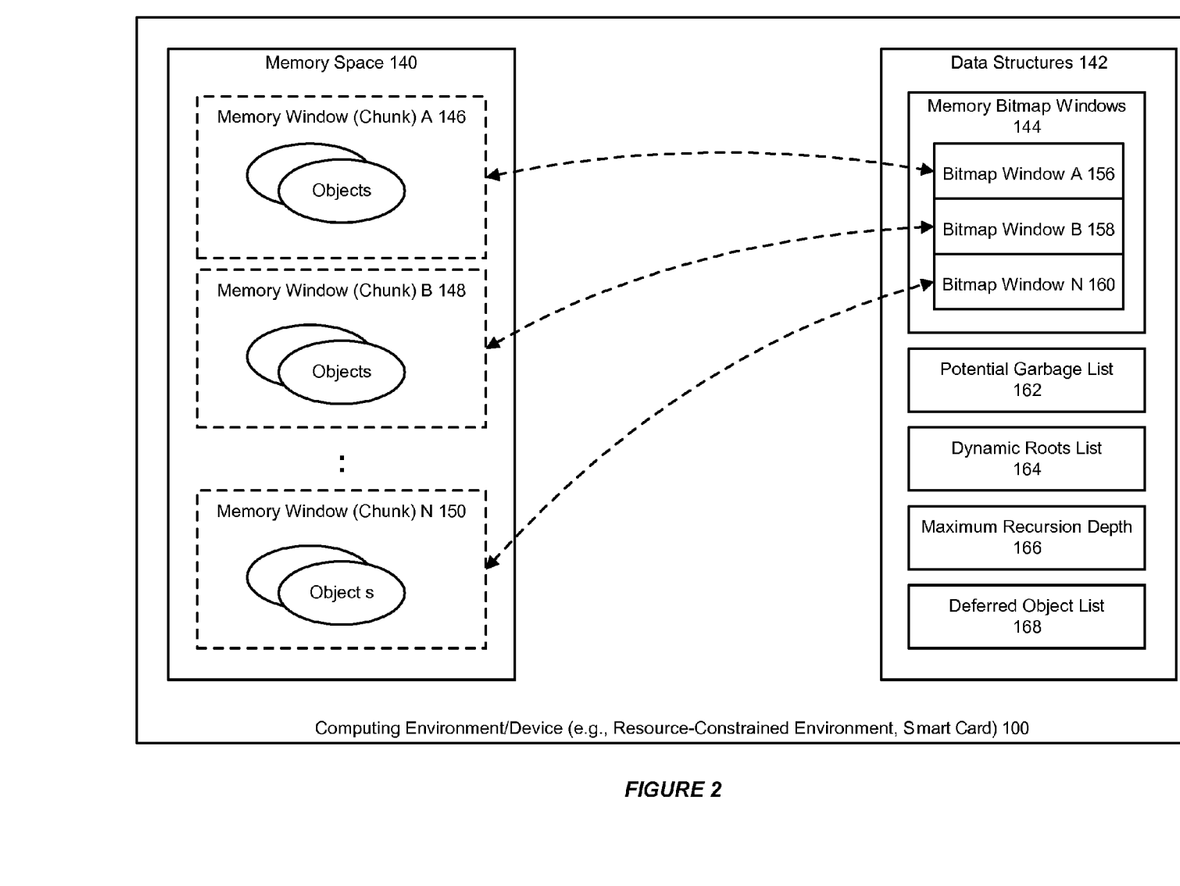
FIG. 2 illustrates the use of bitmap windows representing memory chunks, for object deletion in persistent memory, in accordance with an embodiment.

FIG. 2 illustrates the use of bitmap windows representing memory chunks, for object deletion in persistent memory, in accordance with an embodiment.

As shown in FIG. 2, in accordance with an embodiment, the system can include a data structure 142, which can include one or more memory bitmap windows 144 (156,158,160), which represent a chunk of addressable space 146, 148, 150 in persistent memory 140, for storage of objects. The data structure can further include a potential garbage list 162, which lists objects which are not referenced in windows that have already been processed; a dynamic roots list 164, which lists objects referenced from a previous window but not in the addressable space in the previous window, which become roots for a next window; a maximum recursion depth 166, which is a configurable value that limits the recursion depth for marking phase; and a deferred object list 168, which once the configured recursion depth is reached, includes the children objects which have not been processed yet.

Figure 3:
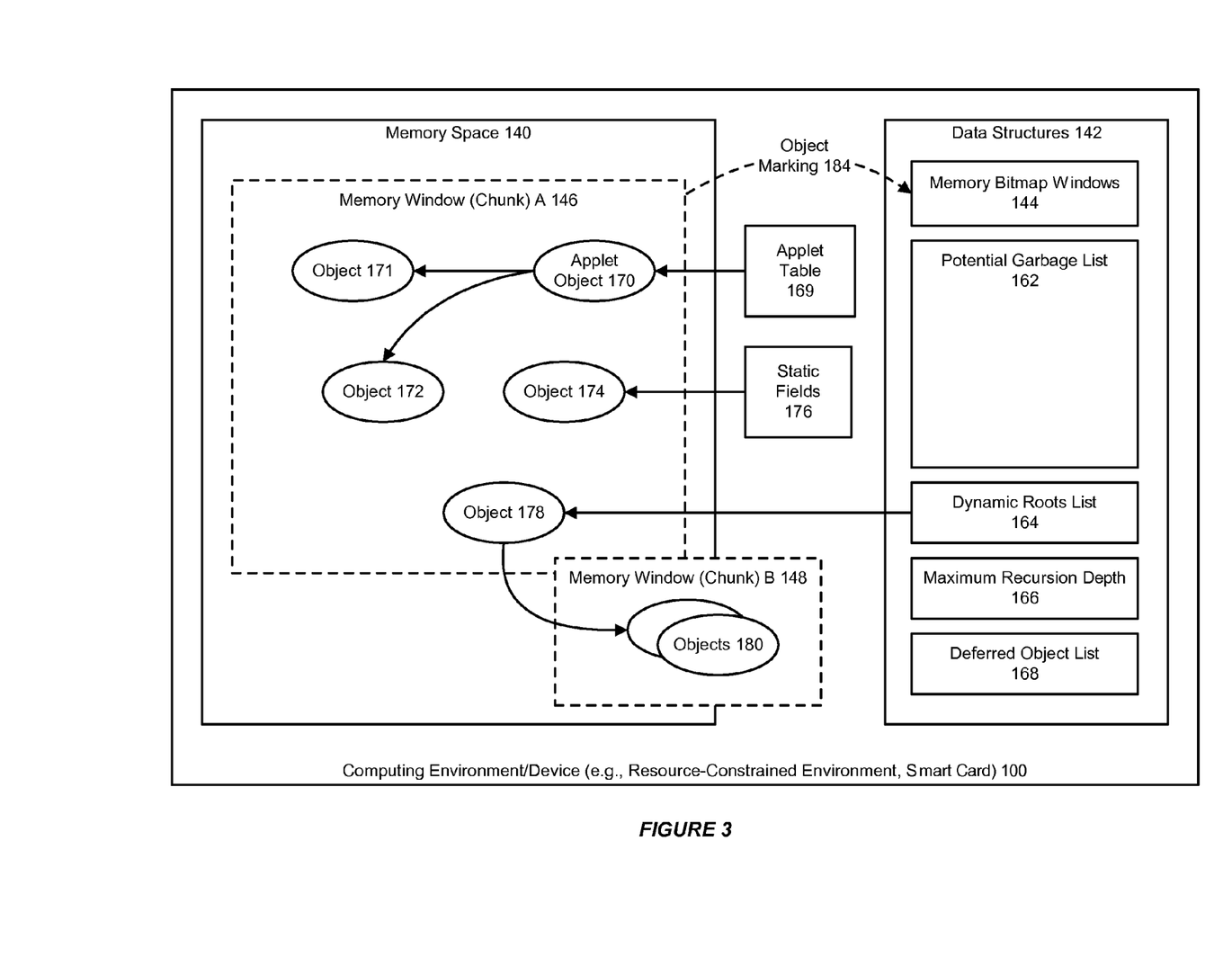
FIG. 3 further illustrates the use of bitmap windows for object deletion in persistent memory, in accordance with an embodiment.
Figure 4:
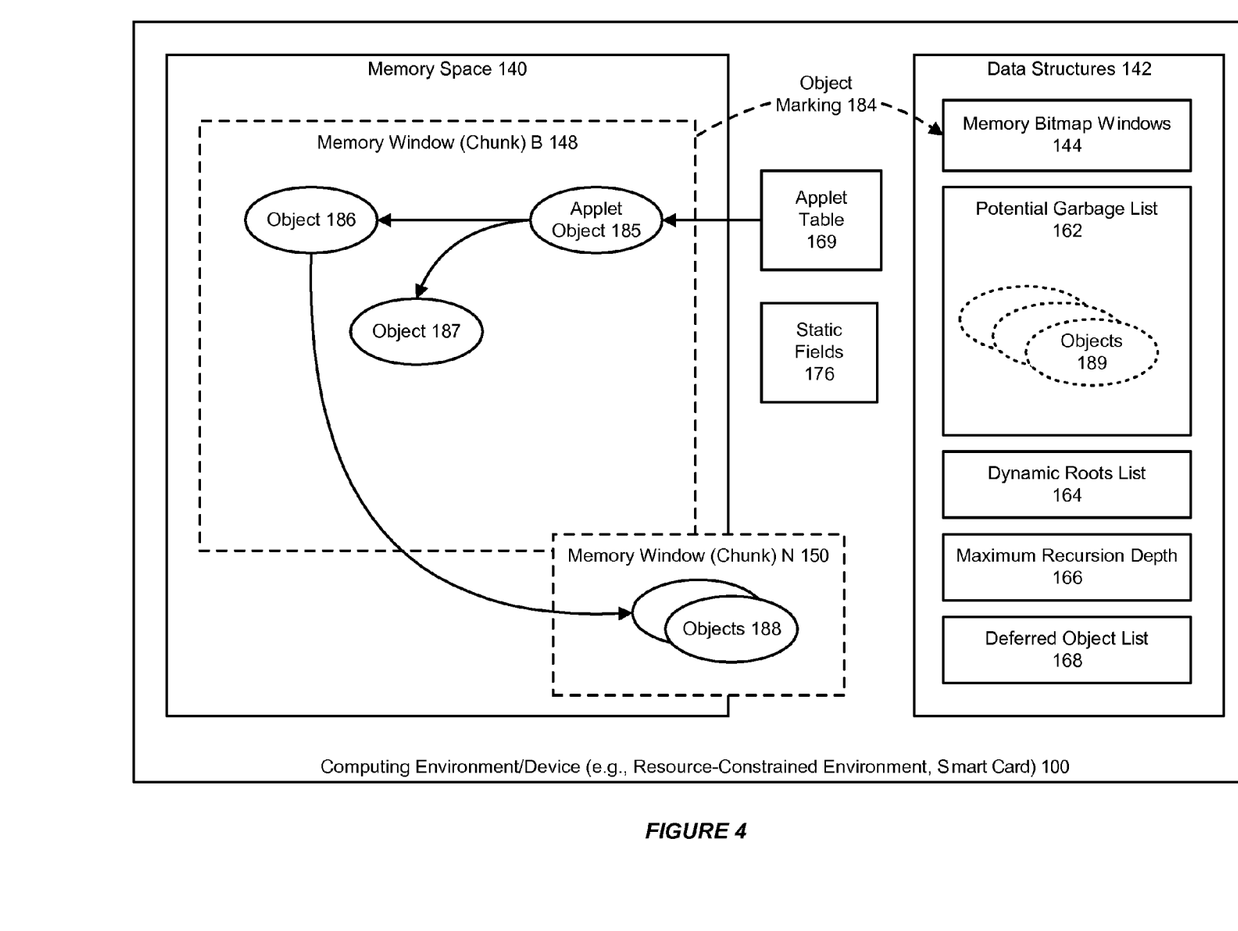
FIG. 4 further illustrates the use of bitmap windows for object deletion in persistent memory, in accordance with an embodiment.

FIG. 3 and FIG. 4 further illustrate the use of bitmap windows for object deletion in persistent memory, in accordance with an embodiment.

In accordance with an embodiment, in order to avoid unnecessary writes to EEPROM during the marking process, the system can maintain a bitmap in RAM. In some environments, for example a typical resource-constrained environment, RAM is a scarce resource; a typical amount might be 2 k, which provides little space for bitmap storage. By way of example, a 512 byte bitmap contains 4 k bits, and each bit can represent 4 bytes, so a bitmap of this size can be used to represent 16 k of memory.

In accordance with an embodiment, during the object deletion process, the system can perform a marking process, which "marks" all objects that are reachable in memory. This can be accomplished by following chains of references from "roots", such as from applet tables and static variables, to find reachable objects. For example, an applet object can point to another object, which points to yet other objects, each of which also point to other objects. Similarly, static variables can point to objects, which point to yet other objects.

In accordance with an embodiment, during a marking phase, starting from a window's root objects, its object children are marked. If a child object resides outside a window, and in a next window, then that object can be put into the dynamic roots list as a root for the next window. If a child object is within this window, then it can be marked, and the system can recurse on the children of that object. If a child object is in a previous window, then the system checks the potential garbage list and recurses on that object, and then removes it from the potential garbage list since it is addressable from this window. After the marking phase for a window, the system looks for objects that were not marked, and puts those in a potential garbage list. These objects may not actually be considered garbage yet, since they may be addressable from a next window. The system then processes the next windows. Ultimately, after completing the windows, the potential garbage list will contain those objects which are not referenced and can be considered garbage.

As shown in FIG. 3, in accordance with an embodiment, the memory space is divided into windows. A bitmap is initialized for the windows, wherein a bit represents an address in memory. For example, if memory management is performed at 4-byte alignment, then a bit can represent the first byte in the 4-byte memory cell. Then, the bitmap windows are processed. For each window, the root objects are marked, including marking applet objects 170 within the current window as indicated by an applet table 169; marking objects 174 that are referenced from static fields 176 which are in the window; and marking objects 178 from the dynamic roots table which are in the window.

In accordance with an embodiment, children objects are then marked, including if a child object 171, 172 is found within the current window, marking that object by marking 184 the corresponding bit in the bitmap. If a child object 180 is found outside the current window in the potential garbage list, then the object and its children are marked recursively in the current window and the potential garbage list. If a child object is found outside the current window and is not in the potential garbage list then, if the object is in an already processed area of the memory, it has already been marked as reachable, and therefore it can be ignored. If, instead, the child object is in an area of memory that still needs to be processed, then it is put in the dynamic roots list.

In accordance with an embodiment, while marking child objects, if a maximum recursion depth is reached, then the next object in the hierarchy is put on the deferred object list, and will be processed at the end of processing the current hierarchy. If the deferred object list is full, and the maximum recursion depth has been reached, then the marking process is started again in the current window, without resetting the bitmap, therefore increasing the number of roots in the second and subsequent cycles. Once the marking phase is complete in a window, any unreferenced objects within the window are put on the potential garbage list.

As shown in FIG. 4, the process continues with the next window and with its root and child objects 185, 186, 187, 188. When all of the windows have been processed, the potential garbage list will only contain objects 189 which are not referenced, and are therefore garbage. In accordance with an embodiment, these objects can be deleted to reclaim the memory used.

Figure 5:
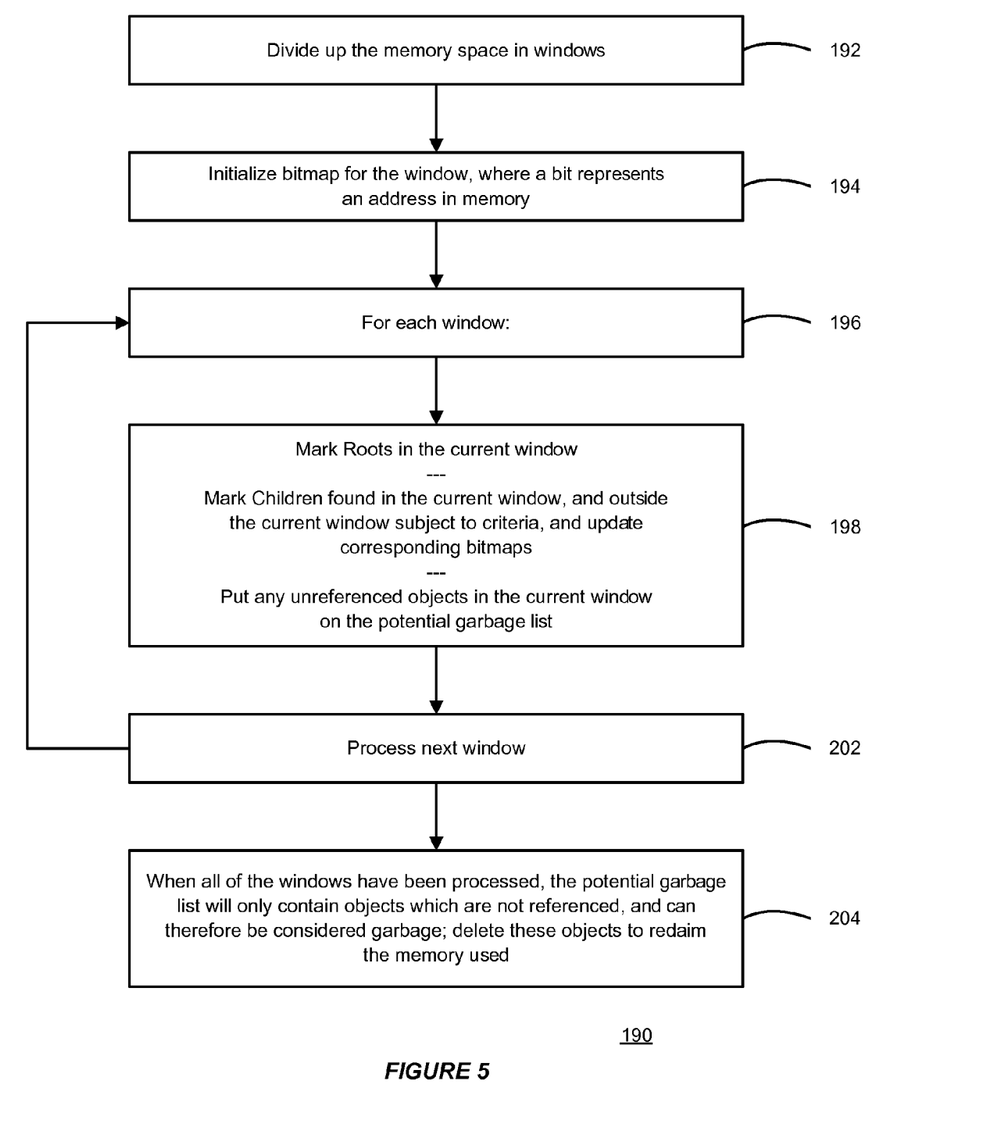
FIG. 5 is a flowchart illustrating an algorithm or method of using bitmap windows for object deletion in persistent memory, in accordance with an embodiment.

FIG. 5 is a flowchart illustrating an algorithm or method 190 of using bitmap windows for object deletion in persistent memory, in accordance with an embodiment.

As shown in FIG. 5, at step 192, the memory space is divided into windows.

At step 194, a bitmap is initialized for the windows, wherein a bit represents an address in memory.

At steps 196, 198 and 202, the bitmap windows are processed. In accordance with an embodiment, for each window, root objects are marked, including marking applet objects within the current window, marking objects that are referenced from static fields which are in the window, and marking objects from the dynamic roots table which are in the window. Then, children objects are marked, subject to criteria as described in further detail below, and the bitmaps updated. Any unreferenced objects in the current window are put on the potential garbage list.

At step 204, when all of the windows have been processed, the potential garbage list will only contain objects which are not referenced, and are therefore garbage. In accordance with an embodiment, these objects can be deleted to reclaim the memory used.

Figure 6:
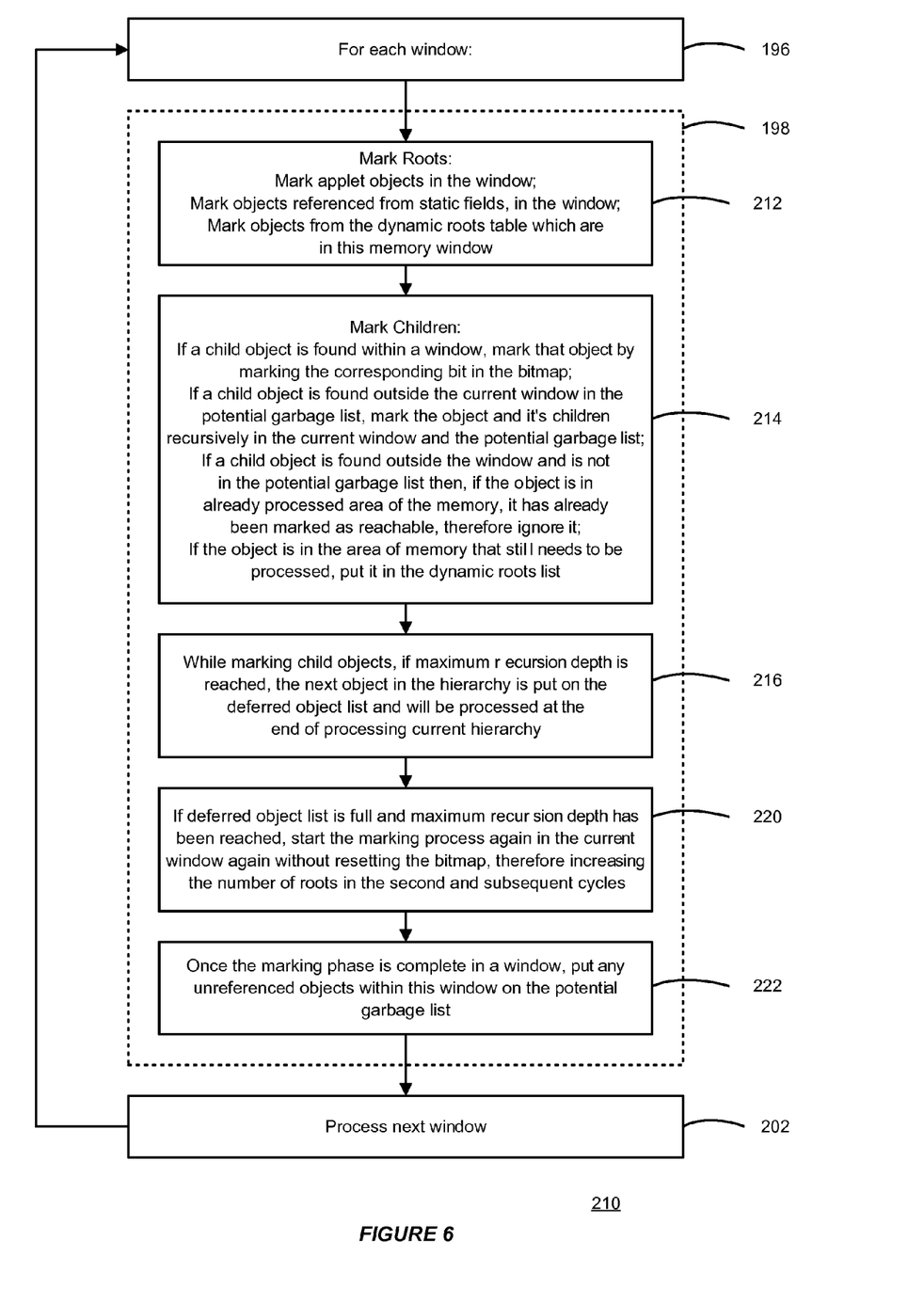
FIG. 6 is a flowchart further illustrating an algorithm or method of using bitmap windows for object deletion in persistent memory, in accordance with an embodiment.

FIG. 6 is a flowchart further illustrating an algorithm or method 210 of using bitmap windows for object deletion in persistent memory, in accordance with an embodiment. In particular FIG. 6 further illustrates how the marking of root and children objects can be performed, in accordance with an embodiment.

As shown in FIG. 6, at step 212, for each window, the root objects are marked, including marking applet objects within the current window, marking objects that are referenced from static fields which are in the window, and marking objects from the dynamic roots table which are in the window.

At step 214, the children objects are marked, including if a child object is found within the current window, marking that object by marking the corresponding bit in the bitmap. If a child object is found outside the current window in the potential garbage list, then the object and its children are marked recursively in the current window and the potential garbage list. If a child object is found outside the current window and is not in the potential garbage list then, if the object is in an already processed area of the memory, it has already been marked as reachable, and therefore it can be ignored. If, instead, the child object is in an area of memory that still needs to be processed, then it is put in the dynamic roots list.

At step 216, while marking child objects, if a maximum recursion depth is reached, then the next object in the hierarchy is put on the deferred object list, and will be processed at the end of processing the current hierarchy.

At step 220, if the deferred object list is full, and the maximum recursion depth has been reached, then the marking process is started again in the current window, without resetting the bitmap, therefore increasing the number of roots in the second and subsequent cycles.

At step 222, once the marking phase is complete in a window, any unreferenced objects within the window are put on the potential garbage list. As described above, when all of the windows have been processed, the potential garbage list will only contain objects which are not referenced, and are therefore garbage. In accordance with an embodiment, these objects can be deleted to reclaim the memory used.

Figure 7:
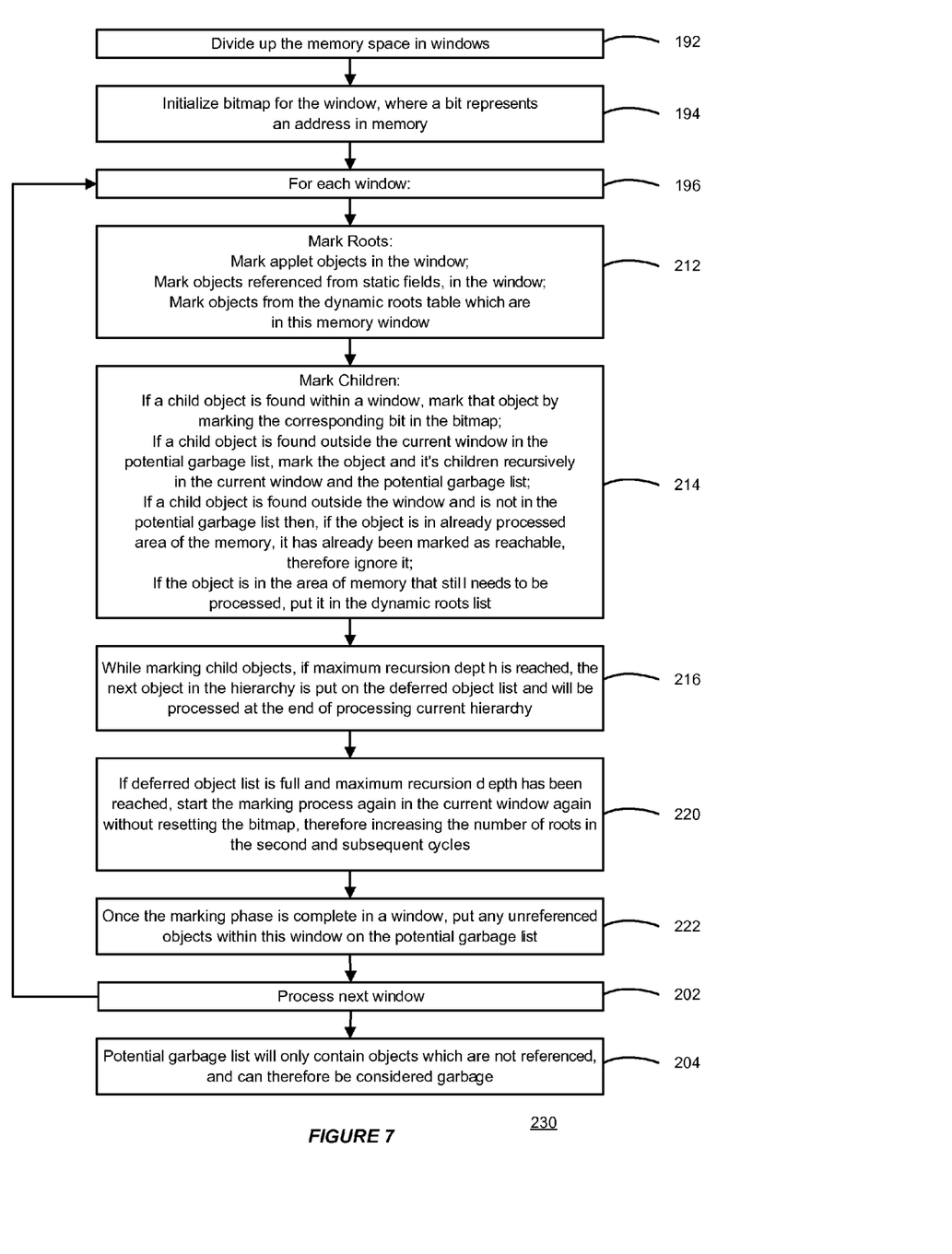
FIG. 7 is a flowchart further illustrating an algorithm or method of using bitmap windows for object deletion in persistent memory, in accordance with an embodiment.

FIG. 7 is a flowchart further illustrating an algorithm or method 230 of using bitmap windows for object deletion in persistent memory, in accordance with an embodiment. In particular, FIG. 7 illustrates the combination of each of the steps previously described at FIGS. 5 and 6, in accordance with an embodiment.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for object deletion in a persistent memory using bitmap windows representing memory chunks, comprising:
    a computing environment or device, including a processor or computational engine and a persistent memory divided into a plurality of memory chunks, each storing one or more root objects and one or more child objects associated therewith;
    a data structure which includes plurality of memory bitmap windows, each of which represents different memory chunk;
    wherein the system uses the data structure to mark non-reachable objects for deletion from the persistent memory, by
        placing a root object not referenced in a particular memory chunk in a potential garbage list,
        determining that a child object of the root object is in a different memory chunk from the particular memory chunk, and performing one of
            if the child object is in a previous memory chunk that has been checked, removing the root object from the potential garbage list, and
            if the child object is in a next memory chunk that has not been checked, using the root object as a starting point to check the next memory chunk for objects for deletion,
        repeating the process until each memory chunk has been checked, and
        marking each object in the potential garbage list for deletion by flagging a corresponding bit in a corresponding bitmap window.

2. The system of claim 1, wherein the data structure Includes one or more of a maximum recursion depth; and a deferred object list.

3. The system of claim 2, wherein the maximum recursion depth is a configurable value that limits the recursion depth for a marking phase; and wherein the deferred object list, once the configured recursion depth is reached, includes children objects which have not been processed yet.

4. The system of claim 3, wherein the corresponding bit represents an address in a memory chunk.

5. The system of claim 1, wherein the root objects and child objects in each memory chunk are marked recursively.

6. The system of claim 1, wherein when the marking phase is complete in a memory chunk, any unreferenced object within this memory chunk is placed on the potential garbage list.

7. The system of claim 1, wherein each memory chunk is processed such that the potential garbage list ultimately contains those objects which are not referenced and can be considered garbage.

8. The system of claim 1, wherein the root objects and child objects in each memory chunk are marked recursively.

9. The system of claim 1, wherein when the marking phase is complete in a memory chunk, any unreferenced object within this memory chunk is placed on the potential garbage list.

10. The system of claim 1, wherein each memory chunk is processed such that the potential garbage list ultimately contains those objects which are not referenced and can be considered garbage.

11. A method of object deletion in persistent memory using bitmap windows representing memory chunks, comprising:
    providing, at a computing environment or device, including a processor or computational engine and a persistent memory divided into a plurality of memory chunks, each storing one or more root objects and one or more child objects associated therewith;
    providing a data structure that includes a plurality of memory bitmap windows, each of which represents different memory chunk;
    placing a root object not referenced in a particular memory chunk in a potential garbage list;
    determining that a child object of the root object is in a different memory chunk from the particular memory chunk, and performing one of
        if the child object is in a previous memory chunk that has been checked, removing the root object from the potential garbage list, and
        if the child object is in a next memory chunk that has not been checked, using the root object as a starting point to check the next memory chunk for objects for deletion;
    repeating the process until each memory chunk has been checked; and
    marking each object in the potential garbage list for deletion by flagging a corresponding bit in a corresponding bitmap window.

12. The method of claim 11, wherein the data structure further includes a maximum recursion depth; and a deferred object list.

13. The method of claim 12, wherein the maximum recursion depth is a configurable value that limits the recursion depth for a marking phase; and wherein the deferred object list, once the configured recursion depth is reached, includes children objects which have not been processed yet.

14. The method of claim 13, wherein the corresponding bit represents an address in a memory chunk.

15. A non-transitory computer readable storage, medium including instructions stored therein which when read and executed by a computing environment or device cause the computing environment or device to perform the steps comprising:
    providing, at a computing environment or device, including a processor or computational engine and a persistent memory divided into a plurality of memory chunks, each storing one or more root objects and one or more child objects associated therewith;

providing a data structure that includes a plurality of memory bitmap windows, each of which represents different memory chunk;

placing a root object not referenced in a particular memory chunk in a potential garbage list;

determining that a child object of the root object is in a different memory chunk from the particular memory chunk, and performing one of if the child object is in a previous memory chunk that has been checked, removing the root object from the potential garbage list, and if the child object is in a next memory chunk that has not been checked, using the root object as a starting point to check the next memory chunk for objects for deletion;

repeating the process until each memory chunk has been checked; and marking each object in the potential garbage list for deletion by flagging a corresponding bit in a corresponding bitmap window.

16. The non-transitory computer readable storage medium of claim 15, wherein the data structure one or more of a maximum recursion depth; and a deferred object list.

17. The non-transitory computer readable storage medium of claim 16, wherein the maximum recursion depth is a configurable value that limits the recursion depth for a marking phase; and wherein the deferred object list, once the configured recursion depth is reached, includes children objects which have not been processed yet.

18. The non-transitory computer readable storage medium of claim 17, wherein the corresponding bit represents an address in a memory chunk.

19. The non-transitory computer readable storage medium of claim 16, wherein the root objects and child objects in each memory chunk are marked recursively.

20. The non-transitory computer readable storage medium of claim 16, wherein when the marking phase is complete in a memory chunk, any unreferenced object within this memory chunk is placed on the potential garbage list.

* * * * *